United States Patent
Rao et al.

(10) Patent No.: US 6,990,087 B2
(45) Date of Patent: Jan. 24, 2006

(54) DYNAMIC WIRELESS RESOURCE UTILIZATION

(75) Inventors: Shekar A. Rao, Ashburn, VA (US); Roberto Berezdivin, Great Falls, VA (US); Allan R. Topp, Montclair, VA (US); Mark D. Levedahl, McLean, VA (US); Robert J. Breinig, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/421,498

(22) Filed: Apr. 22, 2003

(65) Prior Publication Data

US 2003/0210680 A1 Nov. 13, 2003

Related U.S. Application Data

(60) Provisional application No. 60/375,854, filed on Apr. 25, 2002.

(51) Int. Cl.
H04Q 7/00 (2006.01)
H04J 3/00 (2006.01)
H04B 7/212 (2006.01)

(52) U.S. Cl. .................. 370/330; 370/321; 370/337; 370/347

(58) Field of Classification Search ............... 370/321, 370/330, 337, 347, 252, 343, 344, 430, 436, 370/437, 480, 465, 468
See application file for complete search history.

(56) References Cited

U.S. PATENT DOCUMENTS

2003/0112821 A1 * 6/2003 Cleveland et al. .......... 370/468

FOREIGN PATENT DOCUMENTS

| EP | 0 865 172 A2 | 9/1998 |
|---|---|---|
| EP | 0 913 968 A1 | 10/1998 |
| EP | 1 024 609 A2 | 8/2000 |
| EP | 1 035 666 A2 | 11/2000 |

OTHER PUBLICATIONS

R. Hunt; "A Review of Quality of Service Mechanisms in IP–Based Networks—Integrated and Differentiated Services, Multi–Layer Switching, MPLS and Traffic Engineering," Computer Communications, Elsevier Science Publishers BV, Amsterdam, NL, vol. 25, No. 1, pp. 100–108.

(Continued)

Primary Examiner—Chi Pham
Assistant Examiner—Ronald Abelson
(74) Attorney, Agent, or Firm—Baker Botts L.L.P.

(57) ABSTRACT

In one embodiment, a method for dynamic wireless resource utilization includes monitoring a wireless communication resource; generating wireless communication resource data; using the wireless communication resource data, predicting the occurrence of one or more holes in a future time period; generating hole prediction data; using the hole prediction data, synthesizing one or more wireless communication channels from the one or more predicted holes; generating channel synthesis data; receiving data reflecting feedback from a previous wireless communication attempt and data reflecting a network condition; according to the received data and the channel synthesis data, selecting a particular wireless communication channel from the one or more synthesized wireless communication channels; generating wireless communication channel selection data; using the wireless communication channel selection data, instructing a radio unit to communicate using the selected wireless communication channel; and instructing the radio unit to discontinue use of the selected wireless communication channel after the communication has been completed.

37 Claims, 8 Drawing Sheets

OTHER PUBLICATIONS

Randhawa, et al., "Traffic Measurement Based Bandwidth Dimensioning of Broadband Networks," Apr. 4, 2000, pp. 307–320, XP 010376691, 0–7803–5864–3 ©2000 IEEE.

Tanaka, et al., "Optical Parallel Transmission with Multi-Wavelength for High Speed Communications on Indoor Channels", IEICE Transactions on Communications, Institute of Electronics Information and Comm. Eng. Tokyo, JP., vol. E81–B, No. 4, pp. 729–736.

Notification of Transmittal of the International Search Report or the Declaration (PCT Rule 44.1) mailed Sep. 24, 2003 (7 pages), Re.: International Application No. PCT/US 03/12717.

* cited by examiner

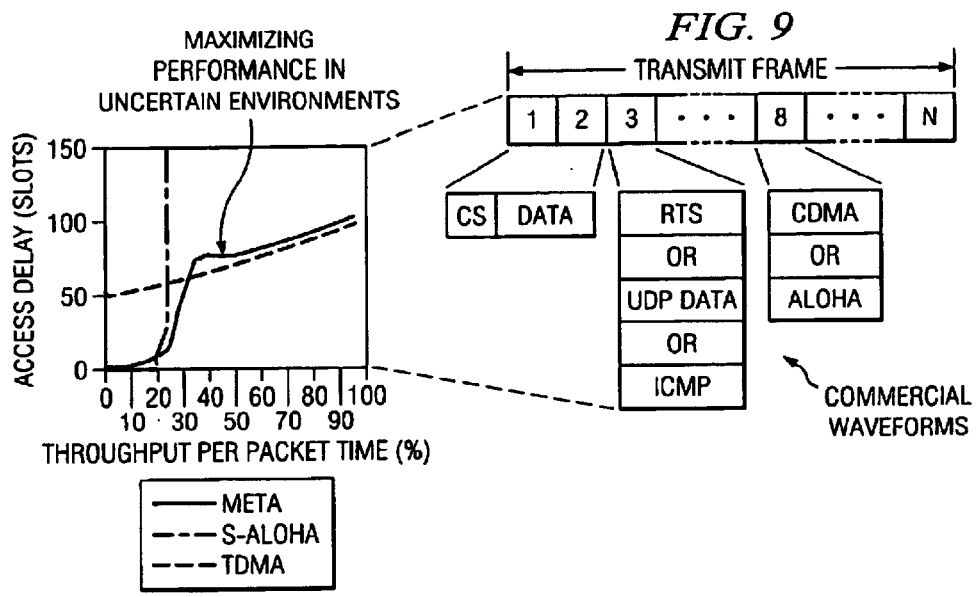
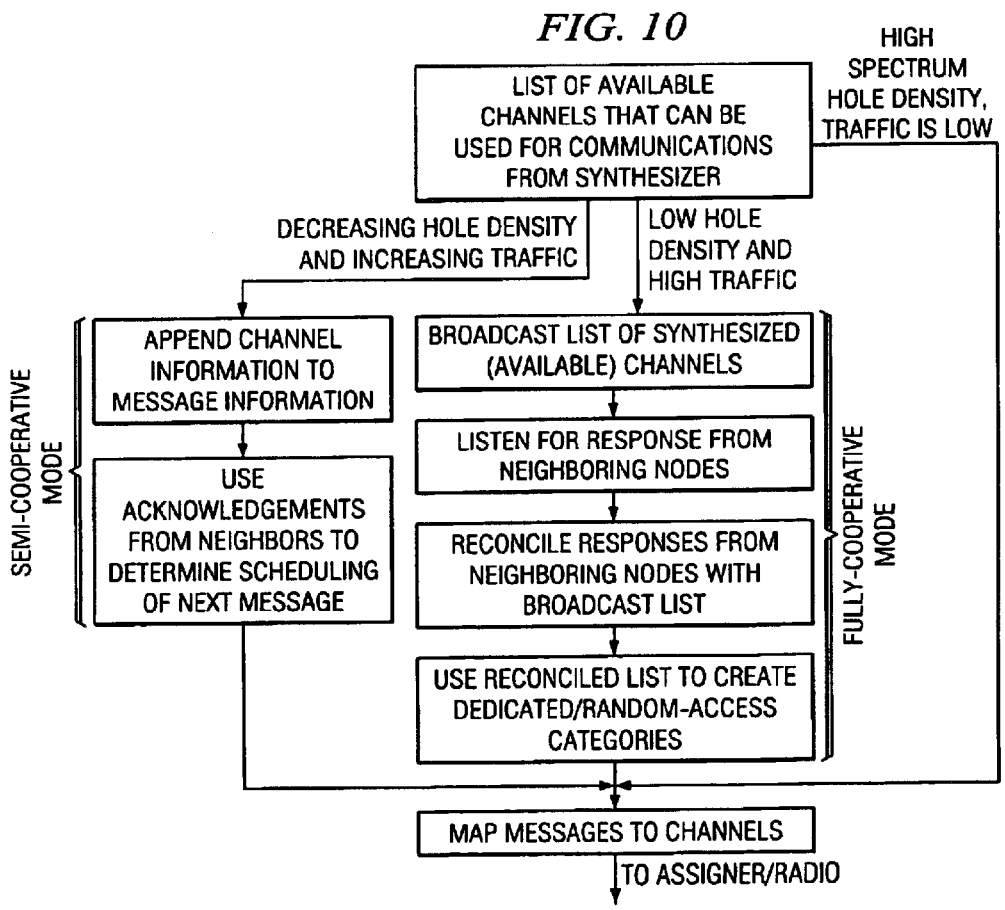

DYNAMIC WIRELESS RESOURCE UTILIZATION

RELATED APPLICATION

This application claims the benefit, under 35 U.S.C. § 119(e), U.S. Provisional Application No. 60/375,854, filed Apr. 25, 2002.

TECHNICAL FIELD OF THE INVENTION

This invention relates to adaptive wireless communications and more particularly to adaptive utilization of one or more available wireless resources.

BACKGROUND OF THE INVENTION

The scarcity of resources associated with use of the electromagnetic spectrum (such as bandwidth) can adversely affect the deployment of new applications by existing and new enterprises (including service providers). As an example, bandwidth requirements associated with a new application that an enterprise wants to deploy could exceed one or more electromagnetic spectrum resources that have been allocated to the enterprise. The rate at which new applications are being deployed has exceeded the ability of many governmental entities responsible for monitoring use of the electromagnetic spectrum to adequately evaluate new applications. Current approval processes are typically slow and costly and tend to favor larger, better established enterprises over smaller enterprises, which can put smaller enterprises at a disadvantage.

Current use of the electromagnetic spectrum enables data transmission at rates between approximately 19.2 to 48 Kbps in channels between approximately 200 KHz to 1.5 MHz. Many current protocols for wireless communication use time division multiple access (TDMA), code division multiple access (CDMA), or circuit switching techniques. User terminals (such as mobile phones) can, depending on the user application, operate in a single mode, dual mode, or trimode. Wireless communication can be limited to regional or national boundaries, and devices supporting wireless communication typically use a dedicated segment of the electromagnetic spectrum.

SUMMARY OF THE INVENTION

Particular embodiments of the present invention may reduce or eliminate disadvantages and problems traditionally associated with wireless communication.

In one embodiment of the present invention, a method for dynamic wireless resource utilization includes monitoring one or more wireless communication resources and generating wireless communication resource data. Using the wireless communication resource data, the occurrence of one or more holes in one or more future time periods is predicted. A hole includes a wireless communication opportunity in which one or more wireless communication resources assigned to one or more first users is temporarily available for wireless communication by one or more second users. Hole prediction data is generated, and, using the hole prediction data, one or more wireless communication channels are synthesized from the one or more predicted holes. Channel synthesis data is generated, and data reflecting feedback from one or more previous wireless communication attempts and data reflecting one or more network conditions are received. According to the received data and the channel synthesis data, one or more particular wireless communication channels are selected from the one or more synthesized wireless communication channels. Wireless communication channel selection data is generated and, using the wireless communication channel selection data, a radio unit is instructed to communicate using the one or more selected wireless communication channels. The radio unit is instructed to discontinue use of the one or more selected wireless communication channels after the communication has been completed.

Particular embodiments of the present invention provide one or more advantages. Particular embodiments enable enhanced use of one or more limited electromagnetic spectrum resources or other wireless resources (such as time slots, power, and codes). In particular embodiments, one or more underutilized wireless resources (which include unutilized wireless resources) are used to provide one or more wireless links for one or more users. Particular embodiments increase utilization of one or more limited wireless resources by a communication system (such as an end-user device, base station, or access point). In particular embodiments, one or more underutilized portions of one or more wireless resources are identified and subsequently used on an as-needed basis to establish one or more wireless links for one or more users. In particular embodiments, instead of monitoring only particular bands, wireless resources are monitored using a multi-dimension, multi-layer process. In particular embodiments, underutilized wireless resources are grouped for establishing wireless links between two users or between a device and an infrastructure point. In particular embodiments, two or more users can negotiate with each other to determine one or more suitable portions of one or more wireless resources for establishing efficient and effective wireless links. In particular embodiments, wireless links are monitored to further increase efficiency and effectiveness for establishing wireless links in the future.

Particular embodiments can be used in next-generation wireless devices in both U.S. Department of Defense (DoD) applications and commercial applications. Particular embodiments enable adaptive use of one or more wireless resources based on the availability of the wireless resources and based on one or more particular needs of one or more users, which can enable high-speed and high quality-of-service (QoS) wireless communication in various conditions. Particular embodiments provide a multi-spectrum, broadband software radio solution for wireless local area network (WLAN), cellular, and other wireless systems that serves as a low cost alternative to ad hoc networks that do not provide overall flexibility. Particular embodiments provide cost effective wireless systems in both DoD and commercial environments.

In particular embodiments, one or more underutilized portions of one or more wireless resources are identified and subsequently activated on an as-needed basis to establish one or more wireless links for information transfer by one or more users. After the information transfer has been completed, the one or more wireless resources can be deactivated to allow one or more other users to activate the one or more wireless resources. In particular embodiments, flexible resource handling techniques are combined with one or more ad hoc network capabilities and one or more network elements. In particular embodiments, more interdependencies are created among network elements to provide greater network coverage and reach. In particular embodiments, an authentication center can verify a user attempting to access a network and subsequently provide one or more wireless links to the user. Particular embodiments use efficient and effective brokering techniques to enable application and need-based resource utilization.

Particular embodiments use one or more segments of the electromagnetic spectrum on an as-need basis for communicating particular data (such as voice data, e-mail data, or webpage data) to ameliorate the scarcity of electromagnetic spectrum resources, which can facilitate use of new services and applications. Particular embodiments can be used to more or less ensure that one or more services use one or more limited electromagnetic spectrum resources only when needed (and relinquish use of the one or more limited electromagnetic spectrum resources when not needed) to enable smaller enterprises to offer more services.

Particular embodiments provide flexible wireless spectrum resource handling techniques, which can increase wireless resource utilization by wireless network elements. In particular embodiments, authentication centers can be easily accessed to verify and provide one or more wireless links between an application supplier and an application user. In particular embodiments, wireless resources are dynamically utilized to accommodate an expanding base of applications.

BRIEF DESCRIPTION OF THE DRAWINGS

To provide a more complete understanding of the present invention and the features and advantages thereof, reference is made to the following description, taken in conjunction with the accompanying drawings, in which:

FIG. 9 is an illustration of an adaptive meta access method to package information in accordance with the present invention;

FIG. 10 is a block diagram of a multi-user MAC functionality showing varying modes of operation of the adapter of FIG. 4.

DESCRIPTION OF EXEMPLARY EMBODIMENTS

Figure 1:
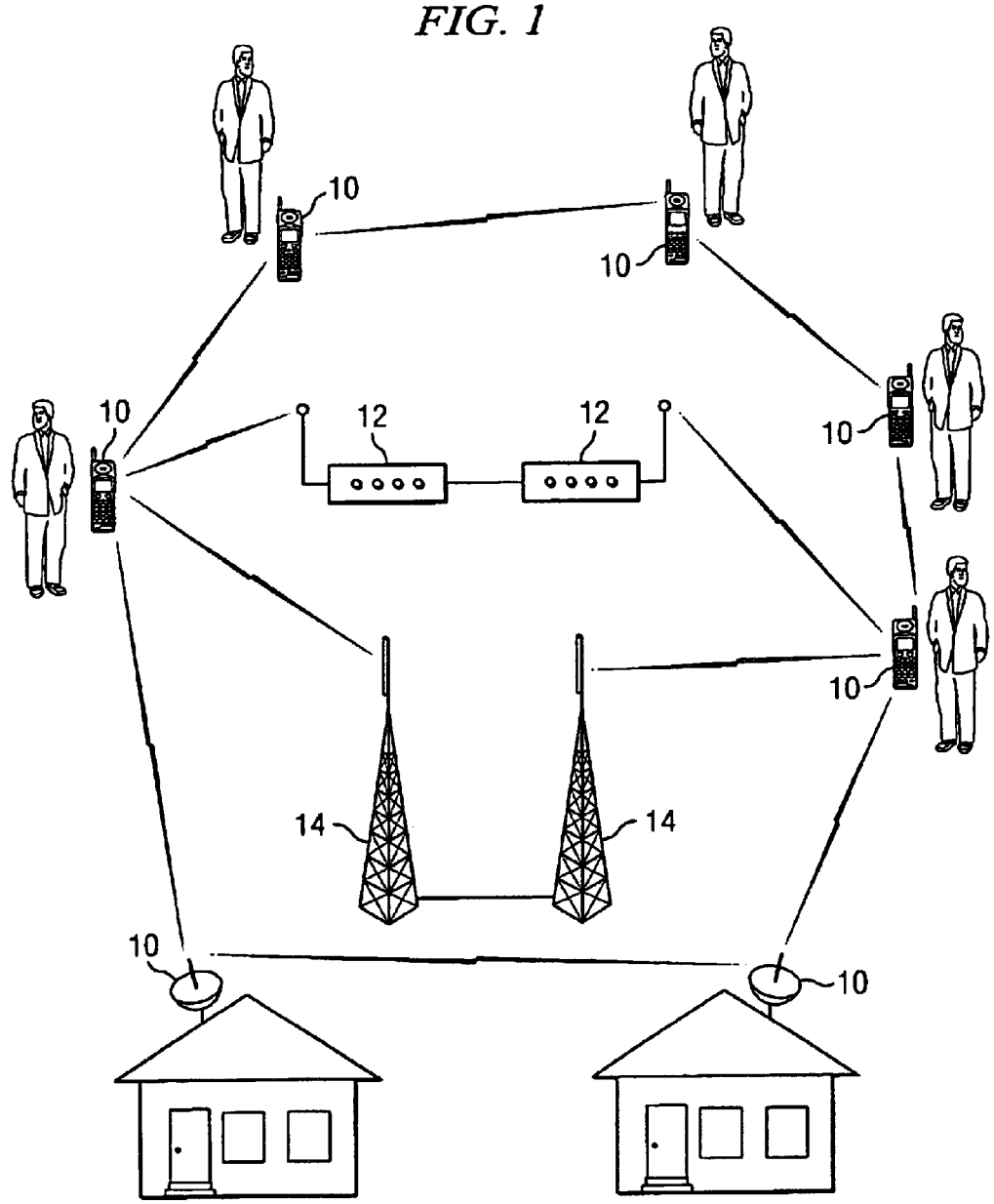
FIG. 1 is a schematic illustration of a wireless communication system for establishing communication links by activating unutilized or underutilized wireless resources.

Referring to FIG. 1, the wireless communications system comprises cellular terminals 10 programmed to identify unutilized or underutilized wireless resources to establish communication links between the cellular terminals and other network elements including routers 12 and base stations 14. Each of the wireless terminals 10 searches for unutilized or underutilized wireless resources to establish a communication link with a destination device. In addition, each of the wireless elements is programmed to establish a reverse process to establish a communication link from an originator of information to enable establishment of a communications link. A terminal 10 could be a mobile phone or a wireless customer premises equipment (CPE) device providing customer access to one or more communication networks. Information can be communicated between two terminals 10, between a terminal 10 and a router 12, and between a terminal and a base station 14 using one or more wireless links. Information can be communicated between two routers 12 and between two base stations 14 using one or more wired (which could include optical) links. A terminal 10 from which information can be communicated can use a softstate adaptive technique (which is described more fully below) to search for underutilized wireless resources for a wireless link to a destination device (which could be another terminal 10, a router 12, or a base station 14). A terminal 10 to which information can be communicated can use a reverse process (which is described more fully below) to enable a final portion of a wireless link to be established using one or more underutilized wireless resources and an softstate adaptive technique.

Typically, the wireless communication system such as illustrated in FIG. 1 operates at data rates of 20 Mbps to 1 Gbps with channel bandwidths greater than 5 MHz. The system operates in a multi-protocol integrated mode using packet switching and is IP based. Each of the cellular terminals 10 are multi-mode adaptive units for global communication sharing wireless resources on an application demand basis.

Figure 2:
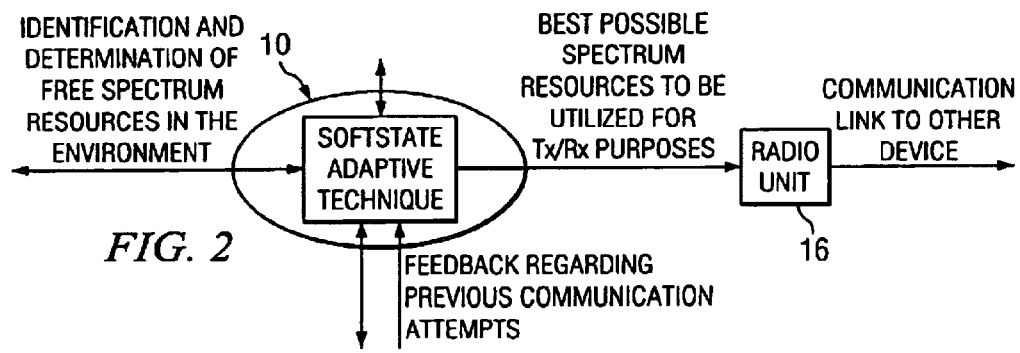
FIG. 2 is a functional illustration of a software adaptive technique for enhancing use of unutilized or underutilized wireless resources.

Referring to FIG. 2, there is illustrated the software resident in each of the wireless terminals 10 functioning through a radio unit 16 as part of the wireless terminal to establish a communication link to other wireless terminals. The software functions to identify and determine unutilized or underutilized wireless resources available in the environment. This is a dynamic allocation method and utilizes smart radio units 16 for enhanced DSP-processing capability in a communication network and wireless terminals. Upon identification of unutilized or underutilized wireless resource, the software functions to select a possible spectrum resource to be utilized for transmission and reception purposes. The identified portion of the wireless resource selected by the software configures the radio unit 16 to establish a communications link. Feedback information is received from the network on previous communication attempts to further refine the identification and determination of unutilized or underutilized wireless resources.

One approach for dynamic wireless resource utilization is based on time evaluation. Three potential time based approaches for sharing scarce wireless resources to meet varying supply-demand considerations include: a) millisecond-second, b) minutes-hours, and c) days-weeks-months. The millisecond-second approach reuses and allocates resources based on temporary demand-supply surges, for example, traffic conditions on a network and emergencies. With this approach, the need for control over a wireless resource by a user takes priority over other users. The time span to establish a communication link and transfer information is too short for resource negotiation or trading of resources with other users. The minutes-hours approach provides the ability to borrow wireless resources from other users to temporarily meet demand. A clearing mechanism is established in the network to enable enhanced user data sharing and profiling ability in HLR/BLR and interconnected networks to allow movement of information over different frequencies. The days-weeks-months approach enables owners of wireless resources to negotiate reuse of wireless resources for special events, such as conferences and conventions. Interconnection and other network elements are established prior to the event happening.

Figure 3:
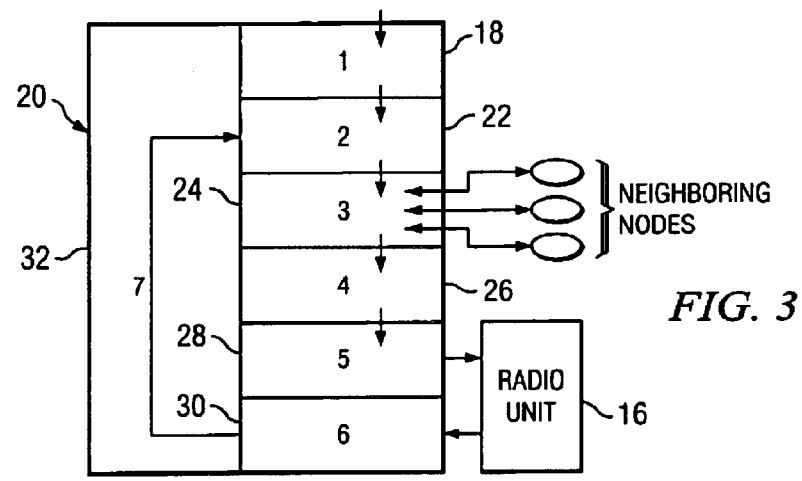
FIG. 3 is a functional illustration of the softstate adaptive method illustrated in FIG. 2.

Referring to FIG. 3, there is shown a flow chart of the operation of the software of FIG. 2 to establish communications links for wireless resource utilization. Initially, the software receives resource data from the environment, for example, sensed, predicted, allocated or stored data, and this data is input during an operation 18 into the software adaptive module 20. In the software operation 22, the wireless resources are analyzed for purposes of creating communication links. This analysis may group the resource based on certain criteria. A communication link may be a frequency band, time slot, power level or other resource, that is "finitely" unutilized or underutilized. Next, in software operation 24, the knowledge gathered on unutilized or underutilized wireless resources are shared with other neighboring nodes in a network to determine the best resource to utilize for establishing communication links. Based on negotiations with neighboring nodes in a network, the softstate adaptive module determines in operation 26 the wireless resource that will best meet the link criteria, for example, bandwidth, power level, QoS. Following determining of the wireless resource to utilize to establish a communication link, the software in operation 28 transmits the wireless resource information to the radio unit 16 for use in activating the unutilized or underutilized wireless resource as needed to establish a communication link for a user to transmit information. In operation 30 of the softstate adaptive module 20, feedback information is received regarding the effectiveness and efficiency of the communications. In operation 32, the information feedback relating to previous communications is incorporated into the analysis operation 22 to better determine wireless resource utilization for future communication links.

Figure 4:
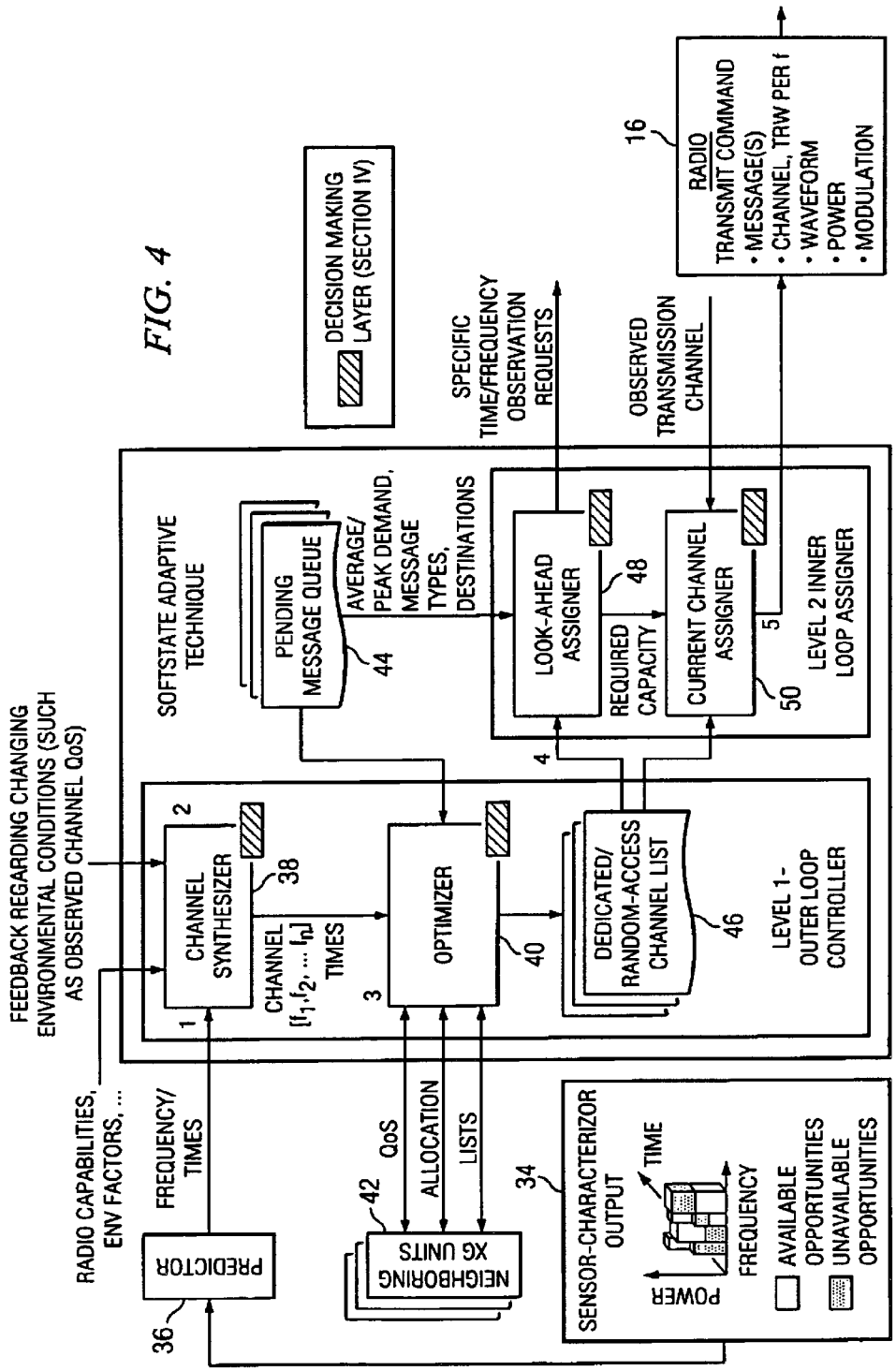
FIG. 4 is a block diagram illustrating the method and system for dynamic wireless resource utilization in accordance with the present invention.

Referring to FIG. 4, there is illustrated the architecture for the software adaptive module 20 of FIG. 3. The wireless resources are evaluated by a sensor 34 based on power level, frequency and time to identify available resources or unavailable resources. This data is transferred to a predictor 36 to output a frequency/time analysis to a channel synthesizer 38. The channel synthesizer 38 also receives information on the wireless resource and environmental factors in addition to feedback regarding changing environmental conditions such as observed channel QoS. The channel synthesizer 38 outputs channel frequencies and times to an optimizer 40 that communicates with neighboring units 42 and receives input from a pending message queue 44. The optimizer 40 outputs a dedicated/random-access channel list 46 that is coupled to a look-ahead assignor 48 and a current channel assignor 50. The look-ahead assignor 48 also receives data from the pending message queue 44 such as average/peak demand, message types, and destinations. The look-ahead assignor 48 responds by outputting specific time/frequency observation requests for future use. The current channel assignor 50 also receives observed transmission on an input channel and outputs to the radio 16 transmit commands including messages, channel bandwidth for frequency, waveform, power and modulation.

The term "softstate" refers to the adaptive ability of the control system to include multiple options for communication means (i.e. the channels formed from combining holes) till the final assignments are made. Feedback-oriented control loops are included to provide for a degree of control during adaptation. The techniques that use Cognition (i.e. awareness of spectrum holes and behavior of the holes) and Softstate (i.e. the ability to move communications between holes that open and close without being fixed to only one hole for the entire communications) will enable achievement of dynamic spectrum utilization. The method of the present invention uses spectrum opportunities that are presented by communication systems and sensor systems such as TV signals, datalinks and radar.

The Cognitive, Softstate Approach to Dynamic Spectrum Utilization consists of the following parts:

1) Prediction of unused spectrum holes based on sensed and characterized data. This awareness of spectrum behavior is the basis for labeling this operation as Cognitive.
2) Synthesizing the holes into channels for communication purposes. This element combined with the Optimization and Assignment elements below constitute the Adaptive Softstate.
3) Optimization of channels to be used by mapping the messages and resources required to the channel availability.
4) Assigning the channels for communications.
5) Dynamically adapting to changes in the traffic offered, the spectrum environment and the network conditions by moving resources to new, synthesized channels based on successful/unsuccessful communications.

The combination of Spectrum Cognition with Adaptive Softstates can increase spectrum and wireless resource efficiencies. This embodiment includes:

Two control loops (fast and slow) providing continuous feedback for a higher degree of adaptability in spectrum dynamics. Faster adaptation takes place during Assignment of holes to messages and the synthesis of channels (e.g.,—where messages are being lost due to collisions or poor channel conditions) while slower adaptation takes place at the Optimization stage (e.g., eliminating the use of spectrum holes that appear to be acceptable, but prove problematic during actual transmissions).

The awareness (Cognition) of the spectrum environment and the impact of using radio resources and spectrum to increase the dynamic nature of the system.

Operations to rapidly utilize spectrum and resources with minimum overhead and latency (Adaptive Softstate).

Move between spectrum holes rapidly by providing multiple mappings of holes to resources and channels, and allowing assignment of holes based on current conditions (Adaptive Softstate).

Referring to FIG. 4, the Cognitive Softstate approach comprises two major blocks. The first part, predictor 36, determines spectrum holes based on sensed/characterized spectrum data provided by the sensing/characterizing function 34. The predictor 36 uses data about the spectrum in its local environment to predict the behavior of spectrum holes in the near future. This is called Cognitive because it exploits the spectrum awareness characteristics. The second part, the adaptor 52, maps predicted spectrum holes to radio resources and communication messages and adapts as elements of communication change. The adaptor 52 uses data from the predictor 36 to determine the most efficient mapping of holes to messages with optimal usage of radio resources. The adaptor seeks to minimize wastage of both radio resources and spectrum resources while ensuring that the communications are completed within the right timeframe and QoS parameters. QoS in this context refers to user-required performance measures such as bit error rates, channel availability and latencies. The adaptor 52 is also responsible for quickly determining success/failure of communicated messages and changing strategies (in terms of frequency bands, power levels, timeslots, codes, etc.) to "adapt" for re-transmissions. This is referred to as Adaptive Softstate-radio resources being deployed and re-deployed in the most efficient manner for reliable communications, with multiple (soft) options considered for best spectral use. The approach is comprehensive in that it will seek out and exploit spectrum opportunities presented by both communication and sensor systems. Holes that are present in TV signals, datalinks and radar will be used and adapted for communications.

Adaptation is enhanced through the use of a 2-loop feedback structure that provides for better control and reaction to dynamic changes in the environment or in the communications. One loop—the fast control loop, allows for quick adaptation to changing spectrum conditions (e.g., sudden emergence of assigned users, severe channel fading) and better mapping of resources to spectrum holes. The other loop—the slow control loop, incorporates significant changes in spectrum behavior or resource utilization at a slower pace (e.g., elimination of certain holes that are problematic, setting aside more dedicated holes, using different modulation techniques) to increase system efficiency and keep it stable. The combination of Prediction and Adaptation functionality in the Cognitive Softstate Approach is also referred to as the Dynamic Predictor Adaptor (DPA). The term "holes" refers to those spectrum opportunities (frequencies, timeslots, codes, power levels) that are un-used by the assigned users and can be used by other users as long as no impact or significant inference is felt by assigned users. It should be noted that some users might work well with some interference, especially if the interference is below a certain level, e.g., in CDMA systems.

The DPA employs a hierarchical-control-architecture (FIG. 4) to do spectrum assignment and utilization. The architecture has two major blocks-predictor 36 and adaptor 52. The predictor 36 functions to continuously look at characterized holes and predict their behavior into the future. The adaptor 52 has 3 separate functions—synthesis 38, optimization 40 and assignment 48, 50.

The synthesizer function 38 is responsible for combining the predicted holes (e.g., frequency bands, time slots, codes) into communication channels. Channels are comprised of single or multiple holes that meet certain criteria (e.g., QoS levels, etc.). The optimizer 40 determines the best set of channels by looking at QoS levels, feedback about previous attempts, external wireless conditions and coordination with neighbors. The assignors 48, 50 handles mapping the optimized set of channels to messages and radio resources (waveform, modulation, coding, etc.). The decision-making process necessary in the adaptor 52 for creating channels from holes, mapping channels to messages and radio resources is carried out using a multi-model Decision-Making Layer. To transmit messages that are compact and packaged tightly, a Meta-Access Transmission method is utilized. The Meta-Access Transmission method will allow rapid exchange of message information between nodes in the network with optimum usage of spectrum and radio resources. The total process is dynamic because feedback is continuously used in combination with environmental data from sensing-characterizing elements to decide how to use the spectrum holes more efficiently.

The hierarchical control structure within the adaptor 52 provides quick response to changing communication needs while maintaining stability in the network. The slow control loop (Level 1—Slow loop or Outer Loop Controller) monitors and updates the list of channels available for use by the specific node and slowly changes assignments of dedicated vs. random-access channels based on QoS and data capacity requirements. The slow loop will verify that deteriorating channel conditions have shown some repeatability before discarding those channels. Again by waiting for a longer period of time before acting, it helps keep the system stable. The fast control loop (Level 2-Fast Loop or Inner Loop Assignor) uses feedback information to quickly adapt to changes in channel behavior through the modification of signal parameters and message packing. Timeframes envisioned for the Level 1 and Level 2 loops are nominally 1 second and 10 milliseconds respectively. These timeframes were chosen as examples based on the need for quick adaptation while ensuring that the system remains stable. By keeping the timeframe for the fast loop very small (e.g., 10 milli-seconds), the DPA will be able to maximize hole usage, minimize the waste of radio resources, minimize latency and prevent unsent messages to be deleted unnecessarily. On the other hand, the slow control loop (e.g., 1 second) will need to only incorporate changes when conditions have changed enough and that warrants a change in the structure of synthesis and optimization of the channels. This timeframe depends more on changes in input traffic and movement of users.

The assignment of channels can take place independently or cooperatively with other nodes. The optimizer 40 and assignors 48, 50 together look at the predicted spectrum environment data, wireless resources and the message queue to determine if the required channels can be assigned (i.e., it sees some unused channel capacity, few messages with good latency to transmit and not too much activity in the environment) or determine whether sharing information with neighboring nodes is required. Based on this information, the node may decide to transmit messages secure in the knowledge that it has more than adequate channel capacity to meet message QoS requirement. This is an independent assignment. This may be the case especially when the node first comes up in an environment. If the environmental conditions change (too many lost messages, increased activity, lower channel capacity), the adaptor 52 will change parameters and will use feedback and information exchange with neighbors. In this event, the node will use information from its neighbors to allocate channels fairly (within any priority guidelines) and ensure that nodes in the network can have some opportunities to transmit. This is called cooperative assignment. FIG. 4 indicates (in the dashed, lightly shaded block), the Multi-User MAC (MUMAC) functionality involved in the determining if independent or cooperative mode should be used in the optimization process. Overall, the adaptor provides dynamic adaptation to environmental conditions by determining the best mode (e.g., independent, cooperation, in-between) and optimal use of resources.

Figure 5A:
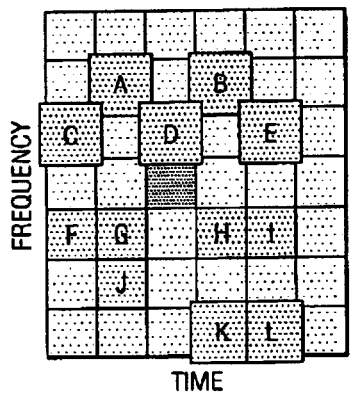
FIGS. 5A through 5E illustrate example DPA functionality.
Figure 5B:
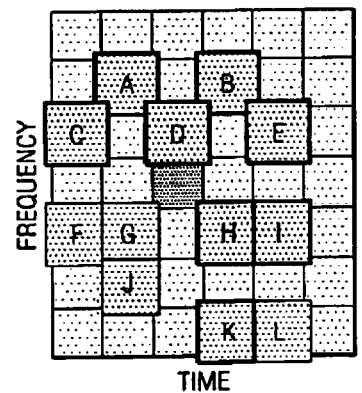

FIGS. 5A through 5B illustrate example DPA functionality. FIGS. 5A through 5B show the methodology used by the DPA to see the holes in its environment, synthesize the holes into communication channels, optimize the best channel configurations, assign channels and finally map the channels to messages and radio resources for communication purposes. In this illustration, a 2D grid of the holes shows the functioning of the DPA. FIGS. 5A through 5B each represent a 25-millisecond timeframe. The center, darkly shaded box in each grid represents an actual usage in a particular frequency band and time by a non-user. The lightly shaded boxes are holes that are not detected, while the boxes containing capital letters are those that were detected and predicted by the DPA.

Figure 5C:
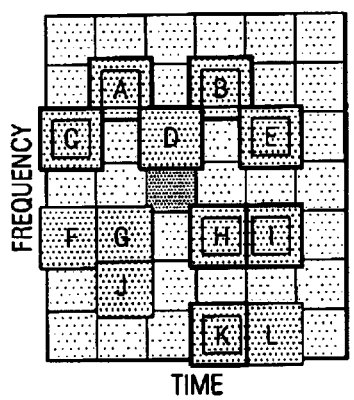

For purposes of explanation, a node is able to detect twenty available spectrum holes in an environment over a 25-millisecond timeframe. Eight of the twenty are dropped for a variety of reasons (e.g., too short a timeframe, past history, etc.) at the predictor 36 and the remaining twelve holes are used for combining into channels. The synthesizer 38 creates six channels comprised of either two holes per channel or one hole per channel (FIG. 5B). The optimizer 40 looks at the synthesized channels and determines that environmental conditions will allow use of all six holes (FIG. 5C). Four of the holes will be used first based on their characteristics and two will be used as fallback. Fallback channels assist in adaptation—if communications on any of the first four are unsuccessful or assigned users appear, then it switches to the fallback channels. The assignor 48 maps the first message to two holes and the second and third messages to the other two holes (FIG. 5D) respectively. Transmission of messages one and two are successful, but message three is not and thus the assignor adapts by successfully re-transmitting using one of the fallback channels (FIG. 5E). At the conclusion of this routine, five channels have been used successfully for communication. During this period of time, there was one assigned user in the spectrum environment seed by the node.

Assuming that over a 100 millisecond time period (four 25-millisecond frames), there was only one and the same user in an assigned band in the environment and the applique was able to repeatedly and successfully use five out of twenty holes in every 25 millisecond frame, then the overall increase in spectrum utilization by using the DPA is twenty times.

FIG. 5A illustrates prediction (Cognitive aspect). The grid shows the Predictor estimation of which spectrum holes will be available for transmission in the next timeframe (25 milliseconds long). Each hole is characterized by frequency and time duration (e.g., 20 MHz BW at 880 MHz for 5 milliseconds). Other channel characteristics such as power level can also be included to provide a greater degree of control. For simplicity, we assume that the holes repeat themselves periodically as shown by the grid.

FIG. 5B illustrates synthesis. The DPA then synthesizes holes into channels. These synthesized channels are illustrated with thick borders in the figure. The synthesizer combines holes A&D into 1 channel and B&E into the second while leaving C, H and I as individual holes that are called channels.

FIG. 5C illustrates optimization (first Softstate level). This part of the DPA looks at utilizing those channels that can provide the most efficient communications with minimum resources. The hole density and conditions in the environment are light enough for the Optimizer to assign all the channels to itself. At the end of the Optimization routine, it is determined that B&E, H, I are the best channels and should be used first while C and K are random access (fallback) channels to be used, if necessary, to meet QoS requirements. The other channels are not satisfactory for use at this instant and are discarded. The double borders and underlined letters in the boxes represent the optimized set of channels.

Figure 5D:
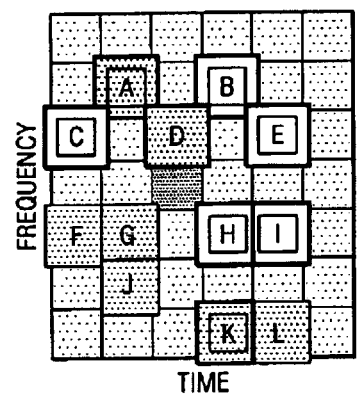
Figure 5E:
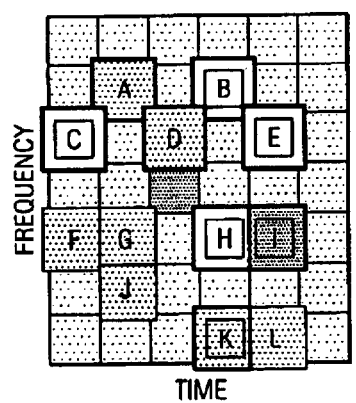

FIG. 5D illustrates assignment (second Softstate level). The DPA communicates using B and E holes for the first message and then uses H for the second message and I for the third message. No acknowledgement is received for the third message sent on I, so C is used to re-send the message and the communication is successful. In this way, 5 of the 12 available holes have been used to communicate messages over a 25-millisecond timeframe.

FIG. 5E illustrates feedback. Repeated failures of transmission on I are fed back through the control loops and the hole I is excluded from consideration in the future by the Synthesizer or the Optimizer. Success in using B, E, H and C allows them to be used as a reliable channels (individually or in combination with other holes) whenever they occur.

The predictor 36 addresses how to successfully estimate spectrum utilization in the environment. It attempts to accurately and rapidly predict the spatial-temporal RF spectral channel characteristics, on a near-continuous basis, throughout the geographic region of interest to a wireless system. Using inputs from sensing and characterizing functions 34 that provide spectral use characteristics, it estimates future spectral use. Hole prediction is carried out in the spectrum used by both communication and RF sensors, and signals such as TV, military communications, datalinks cellular and radars. Spectrum assigned to radars may be completely unused over large geographical areas. Further, typical scanning or pulsed radars have short duty cycles and large temporal holes in the frequency range of operation. These holes could be predicted with a degree of confidence and utilized for transmission. When using radar spectral and temporal holes, the effects of the significant sidelobes/backlobes will be considered to ensure that the power in these sidelobes/backlobes does not drown out the data transmissions.

Spectral utilization is a function of time, frequency, and location. At any instant in time, a single user transmits a signal with a certain bandwidth and center frequency. That signal decays with distance from the source according to local propagation conditions. Hence, at a particular location in space, differing power levels are present in the time-frequency dimensions. Observations are divided into time bins that are classified as either occupied or available according to some set of metrics (e.g., power level, duty cycle, etc). The observed energy is computed for each bin by scanning the defined channel bandwidth for the specified sampling period. This power level is compared with a specified power level threshold and the entire observation bandwidth is classified as either "occupied" or "available" for the sample duration. This process represents the first procedure in selecting holes that are then synthesized into channels for signal transmission.

Figure 6:
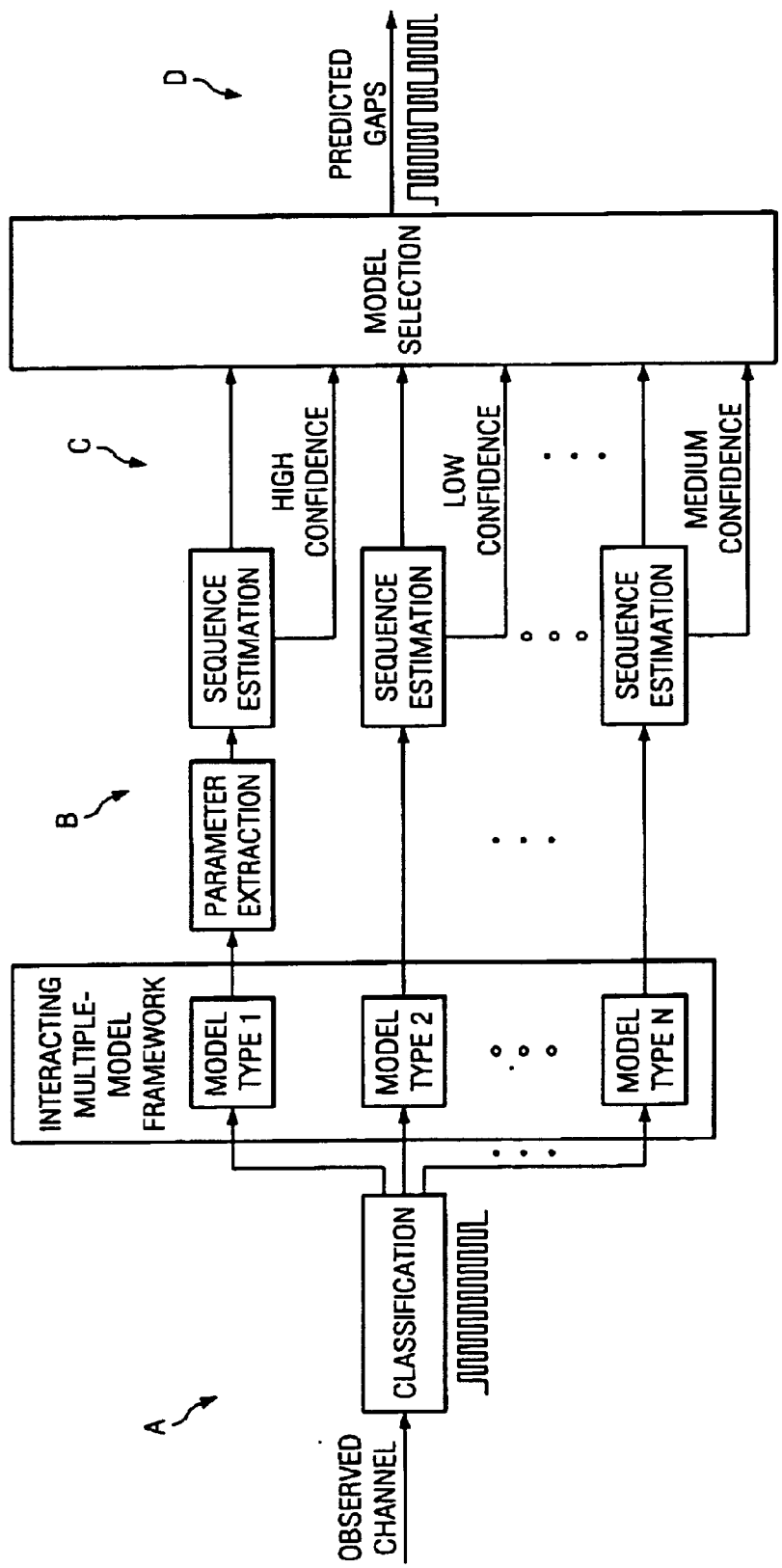
FIG. 6 is a block diagram of the predictor of FIG. 4.

Referring to FIG. 6, the observed spectral usage that is sensed and characterized is fed into the predictor 36 at point A. Then, classification of the observed spectrum holes is carried out to determine if the behavior is deterministic, stochastic or mixed in nature. Based on the classification, the observed hole data is fed into the appropriate model type. The model type enables specific parameters that more completely describe the characteristics of the waveform (e.g., duty cycle, amplitude, etc.) to be extracted at point B and fed into a sequence estimator. The sequence estimator will predict the behavior of the waveform for a given time interval in the future, based on past observations. The resulting estimated sequence and a measure of the confidence in the estimation are generated at point C for each model. Note that for some classification models, the parameter extraction stage is skipped in favor of immediate sequence estimation. The different estimated sequences and confidence indicators are fed into a model selector to yield the predicted time gaps in the channel at point D.

The predictor 36 will focus on identifying different prediction model types, assessing prediction accuracy for different underlying channel usage characteristics, identifying appropriate confidence estimates, and developing methods for selecting the appropriate model. Classes of prediction models (model types) include the following:

Simple "inertia-based" techniques that track the duty cycle of the channel utilization over a time scale of at least several seconds and assume that "a channel in use tends to stay in use" and "a channel at rest tends to stay at rest". Exponential decay with a single, tunable parameter is a simple example here, which can be used for time gap prediction.

Periodic techniques that assume periodic spectrum usage over some time scale to allow spectrum sharing. An example where this would be applicable is with ground-based azimuthally scanned radars.

Filter-based techniques where the spectrum availability time series is digitally filtered to extract key parameters that can be used to predict future values. Slot or frame rates and sub-harmonics can match this model type well.

Time series prediction methods that have been used to successfully predict future values of complex time series based on past observations. Complex TDMA assigned slots can be tracked using this model type.

Spectral techniques where information about the spectral shape and/or bandwidth is used to enhance prediction values and assess confidence regarding the rate of change of spectrum availability. This is particularly useful where spectral variations are better understood. TV channel spectra may be best predicted using this technique (within some uncertainty limits).

The performance of the predictor 36 will be based on the concept of classifying gap prediction errors into "collisions" (i.e., non-existent gap predicted) and "missed opportunities" (i.e., failure to predict available holes). Since the major objective is to maximize spectrum use while minimizing impact to existing spectrum users, collisions and missed opportunities need to be traded off against each other. In order to assess model performance, the likelihood of collisions and missed opportunities needs to be measured against a wide range of time-spectrum behavior. Confidence estimates will be developed based on a combination of "goodness of fit" of the observations to the assumptions of each model type (e.g., for a periodic model, does the gap length vary) and collision/missed opportunity performance measures. Confidence estimates will monotonically decrease as a function of how far in advance channel availability is predicted.

Prediction techniques will attempt to incorporate long-term and short-term spectrum usage history to improve model prediction accuracy and reduce computational burden. When there is little channel usage information available such as during initialization, multiple model types will be needed to characterize spectrum gap behavior. As more channel information becomes available, only specific types of models need to be used to allow for faster convergence to the right characteristics. This analysis methodology will evaluate the utility of different classes of gap prediction algorithms and provide confidence estimates for different channel usage characteristics to facilitate model selection.

Figure 7:
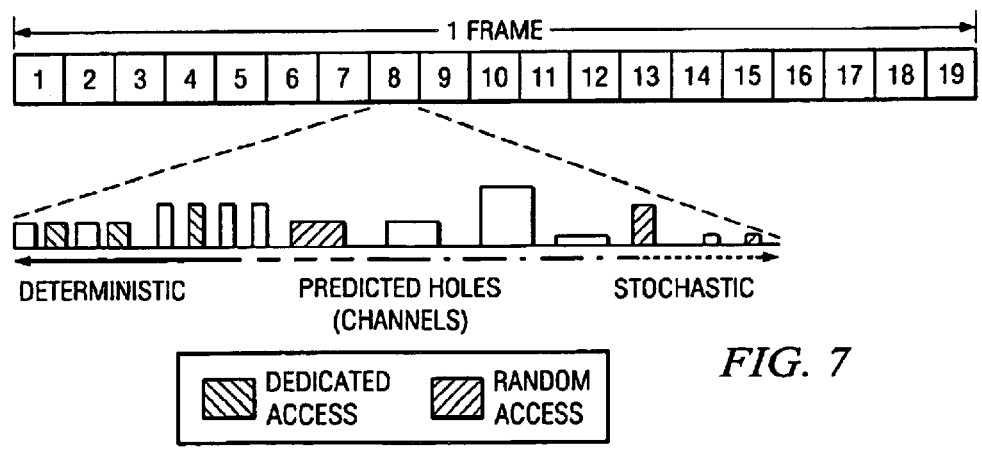
FIG. 7 is an illustration of channel synthesis and optimization based on predicted hole characteristics.

The synthesizer-optimizer (S-O) 38,40 forms the core of the DPA. Referring to FIG. 7, the key role of this component is packaging the predicted holes into channels that can be used for communication purposes and then optimizing the channels as dedicated, random-access type or hybrids to dynamically meet the anticipated communication needs. The optimizer 40 also decides on the type of negotiations—independent or cooperative that needs to be done with neighbors in the network to obtain the best resource utilization. Packaging of information to be communicated is done using the Meta-Access Transmission method while deciding what conditions required independent operation or cooperation with friendly users is done by the MUMAC (Multi-User MAC). The S-O 38,40 represents the basic adaptation engine of the DPA.

The predictor 36 provides a list of holes, each identified by a specific frequency, bandwidth, and measure of time. Thus, a spectral hole could consist of a 10 MHz Bandwidth in the 900 MHz spectrum (900–910 MHz) that is unused for 10 milliseconds and occupied for the other 90 milliseconds by assigned users in a 100 millisecond timeframe. The time measures vary from purely deterministic (e.g., specific start time and duration of next hole) to purely random (e.g., expected rate of occurrence of holes, expected shortest duration of a hole). Hybrids provide intermediate options (e.g., specific start times and alternate with backoff if there are collisions). The channel synthesizer 38 packages these individual frequency predictions into channel predictions—these include a list of frequencies to be used (e.g., sequential, simultaneous, mixed), the bandwidth to use in each, and the relevant time opportunities. This is done through a pattern matching process-looking for specific combination of resources available over a certain time period and appearing in a pattern that provides the throughput needed. Specific radio capabilities and apriori and/or observed environmental factors are used to synthesize lists of usable channels. Furthermore, the synthesizer 38 must adapt to QoS needs and observations obtained through feedback on various channels. An allocated channel on which no successful transmissions occur over some successive number of tries is deleted from current use. A hole not in the channel allocation list is not used.

An efficient approach to configure the available and predicted holes into channels examines the characteristics of each hole and determines its capabilities. Based on the hole characteristics, one or multiple holes will be grouped into channels to be used in the Optimization process. The process is outlined below:

Designate the outputs (sequence of holes) from the predictor as $f_{i \ldots n}(t)$. Communications channels are comprised of specific combinations of these holes at specific times. Various approaches to synthesizing channels may be appropriate. At the simplest, each individual hole, $f_i$ is taken as a channel, and availability is as predicted. This is clearly the simplest set of decision logic applicable to this function. However, it is often more efficient for throughput purposes to assign multiple holes. Therefore, the next level of complexity will consider combinations of two or more of the holes ($f_i$), but coincident in time. Furthermore, each $f_i$ is a member of just one set. Specific channel availability is then determined by the simple combination of the $f_i$ in the set (Equation 1):

$$F(t) = \prod_{i=1}^{n} f_i(t). \tag{1}$$

Better use of the spectrum is achieved by considering multiple combinations of the $f_i$, and using temporal offsets. Thus, $f_1$, could be used for the first 12 $\mu$s of a channel, followed by $f_2$ for some period, etc. Furthermore, consider using $f_1$ in combination with a number of other items non-exclusively, deferring until a later time the decision as to which use is optimum. This more general approach brings in combinatorial complexity to achieve potentially better spectrum use.

The optimizer 40 maintains a list of channels (comprised of individual or sets of predicted holes) for use by the radio.

The primary function of the optimizer is to ensure that adequate channels are available to the assigner to maintain QoS. It allocates channels as dedicated, random-access or hybrid base on QoS constraints, past history and other criteria. Under-allocation of channels by the optimizer reduces local (nodal) QoS because of partial transmissions or deletion of messages due to timeout. Over-allocation of dedicated channels will result in lower overall system QoS since all nodes may communicate simultaneously and collisions will increase.

Figure 8:
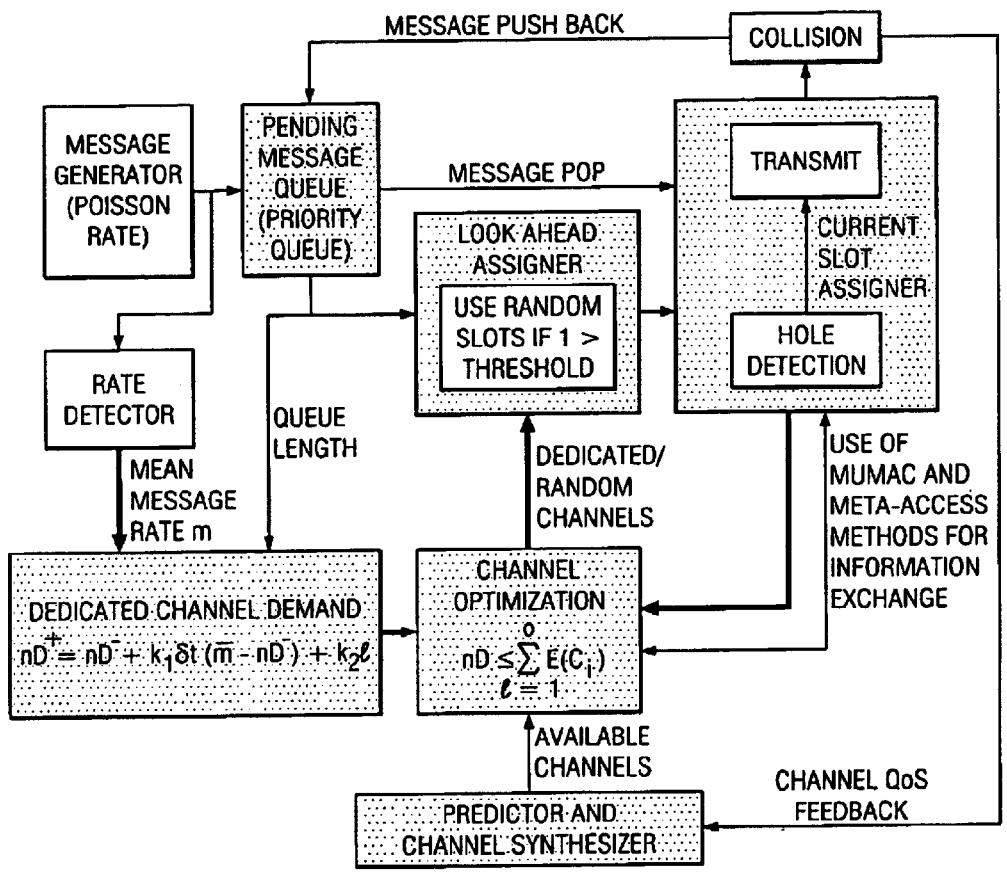
FIG. 8 is a block diagram of closed loop structure of the optimizer of FIG. 4.

Referring to FIG. 8, there is illustrated the closed loop approach used by the optimizer 40 to categorize synthesized channels into different types. The approach relies on several associated elements and is key to the functioning of the DPA. The fundamental assumptions in this approach are that 1) the rate of message and hole arrival are in general random, and 2) the state of all neighboring nodes message queues is not known globally in sufficient detail. Hence, real-time global optimization of channel (hole) usage would be computationally too complex and time consuming to attempt. The primary objective of the overall control, and of the optimizer 40, is achieving QoS in message delivery as determined by message latency parameters. The goal is to achieve this while maintaining efficient use of available bandwidth, and allowing for some gradual degradation in performance as demand reaches and exceeds overall capacity.

Basic operation of the optimizer 40 is to dynamically adjust the requested dedicated channel capacity, nD and is exemplified by the equation in FIG. 8 (Dedicated Channel Demand box). Here, the demand is dynamically adjusted based upon mean rate of message entry into the queue over some period of time, and augmented by the message backlog in the queue. The optimizer 40 then determines a set of channels that in aggregate will meet this capacity. Based on the channel characteristics and other factors, a channel can be a dedicated (i.e., use first for transmission) or a random-access (i.e. use only if necessary). This determination of dedicated vs. random access is done independently or can include information from neighboring nodes-cooperatively. Lots of holes and few messages would allow independent operation by each node without the additional overhead of cooperation, while fewer holes would necessitate some degree of cooperative information sharing between neighbors to ensure fairness and maintain throughput.

Tradeoffs involving overhead capacity used in exchanging information exist, so that smart channel allocation and selection techniques that work in an independent mode or with little overhead, are preferred.

In the case of independent assignment of channels to resources and messages, a condition can arise by the node having multiple channels with the same or similar characteristics to choose from to communicate and resources could be used trying to determine the best of these channels. The process of choosing the channels optimally can be designed to randomly select almost equally good channels (and add inertial effects to minimize useless changes).

The Meta-Access Transmission method is used to package information (e.g., messages, data, channel information, etc.) effectively and efficiently. As part of this transmission, information about the environment (e.g., channels available, used, message queue, etc.) may be added to the message data. This will allow lower overhead in terms of alerting the receiver to what the sender is seeing, help in future scheduling, reduce time and resources needed for feedback and negotiations between neighbors and conservation of radio resources and channel holes, but is done only when environmental conditions require cooperative channel assignments.

The method of the present invention allows information transmission to adapt dynamically and also be able to match the best component protocol for the current waveform, which may include SDMA, DDMA, CSMA, TDMA, BAMA and CDMA or other protocols. FIG. 9 illustrates a sample frame for the Meta-Access Method of transmitting information. The scheme allows the use of both allocation and contention methods in deciding how to best transmit the information.

The Meta-Access method can use dedicated or random access channels for transmission purposes. Built into the protocol are access delay bounds and provisions to prevent instability. This allows for greater spatial bandwidth reuse. The performance of this method is directly dependent on the number of mobile nodes in the network. The protocol will decide on whether to use broadcast or unicast transmissions based on different criteria such as available channels, previous successes/failures, message traffic, QoS levels, latency, etc. Therefore, support for both point-to-point and multi-point traffic in a unified manner will be part of this method.

The ability to correctly represent the channel possibilities, initiate communications and use the performance feedback to cognitively select a schedule while including a cooperative exchange of schedule information with other nodes will directly impact the throughput of the radio as well as the use of resources for communications.

Referring to FIG. 10, there is illustrated a multi-user MAC structure that will allow the adaptor 52 to dynamically decide how to communicate with other nodes in the network. The optimizer 40 will look at different factors such as the environmental conditions, wireless resources and message queue to decide if it needs or does not need to negotiate with neighboring nodes regarding channel access. In the event of expected, un-conflicted assignments and multiple possible channels, the optimizer 40 will decide to transmit information to a neighbor node without doing any coordination. If this method succeeds and the environmental conditions change slowly enough to be tracked, the optimizer will continue to follow this path. This will result in efficient use of resources and spectrum. This mode is identified as independent operation. In independent mode, the dedicated access holes will be the ones used first used for communications and then the random access holes.

As environmental conditions change (e.g., hole density start to decrease or failures to communicate and re-transmit requests increase), the optimizer 40 will start coordinating with neighboring nodes. It will do this in two ways—semi-cooperative and fully-cooperative modes. In the former case, the optimizer will append spectrum hole information seen in its local cooperative environment to messages being transmitted. The optimizer may also request some information to be sent back from the receiver as part of an acknowledgement. This low overhead method of exchanging information will allow the optimizer 40 to understand the conditions in other parts of the network and make better decisions regarding the use of spectrum holes and wireless resources for communications. In this mode, the optimizer may decide to use only portions of its dedicated access holes and allow other nodes to use some of them. It may also decide to increase the usage of random-access holes to decrease latencies in the network.

The optimizer 40 will switch to a fully-cooperative mode when a significantly decreasing availability of holes is observed. In this mode, local knowledge of spectrum holes and "intentions to transmit" will be sent to the neighbor nodes and information sent back by neighbor nodes would be used to determine a fair sharing of spectrum holes. This exchange of spectrum hole information will allow each node to determine which holes should be dedicated and which should be random-access for each one. In this mode, dedicated holes are always used first, since allotment of dedicated holes to different nodes have been completed, the collision probability would be very low. Careful use of random-access holes can be done, since chances of collision and consequent waste of resources would occur because many of the nodes may decide to use them simultaneously.

The optimizer 40 will use the Meta-Access method described to decide how scheduling information should be packaged with other message information in the semi-cooperative mode. However, when the optimizer 40 switches to the fully-cooperative mode, it will also use the Meta-Access method format to package information solely on holes that it sees and how it will utilize them for communications.

The multi-user MAC structure will support both unicast and multi-cast communications. The exchange of information in both Broadcast and Unicast modes will be encoded in a compressed format that represents available transmission opportunities with respect to time, frequency, power and other parameters. Broadcast will be used when multi-point communications are required for sparse networks, while unicast will be used to support rapid, low overhead point-to-point communications.

Referring again to FIG. 4, the assignors 48, 50 has two primary functions: 1) matching channels with messages, and 2) determining the specific waveform parameters to be used for each transmission. Again, the Decision-Making structure is used to determine the best matching and mapping possibilities. The assignors 48, 50 seek to solve the following challenges:

1) The channels are overlapping in both time and frequency.
2) Channel selection involves continuous listening (sniffing and feedback) to identify changing channel conditions.
3) Channels selected for use may offer less than the expected QoS due to a number of temporal factors including simultaneous usage by adjacent nodes and possible interference from non-cooperating devices. Channel combinations will be used to provide the best possible QoS under heavy environment loading conditions.

The Look-Ahead Assignor (LAA) 48 maps the current set of prioritized messages to the channels available in the next one or two 20 millisecond frames and the radio resources that may be required to accomplish a successful communication. This mapping is tentative in nature and so an optimal mapping is not always necessary. In general the transmission channels are stochastic, some message transmissions may fail, and additional high priority messages may arrive over the frame of interest. This tentative mapping is used to determine two key sets of data—one: specific channels of interest where transmission capabilities must be sensed, and two: the overall RF parameters and channel selection strategy to be employed.

The LAA 48 receives input from the optimizer 40 and also looks at the message queue 44 and creates a mapping between the communication channels and messages. This mapping may be one-to-one (a channel to a message), many-to-one (several channels for a message) and many-to-many (multiple channels for multiple messages). The latter two cases are of special interest because the role of the LAA 48 is more strategic in nature. The LAA 48 functions to ensure that the current assignor 50 can rapidly adapt to changing environmental conditions such as absence of a predicted channel, repeated failures to transmit, re-transmit requests, etc. By providing a larger set of possibilities to utilize, adaptive ability as well as the softstate flexibility of the assignor-radio is enhanced significantly. This technique provides increased efficiency in the dynamic utilization of spectrum.

The LAA 48 constantly re-calculates the number of channels needed to meet the requirements of the message queue. This way it determines very rapidly if the messages are queuing up too fast and it needs to alert the optimizer 40 to change the partitioning structure of dedicated vs. random access holes through negotiation with neighboring nodes. The number of channels needed for a given message queue size can be estimated by equation 3:

$$N_Q^k = \lambda_k \frac{\sum_{i=1}^{n} \lambda_i \overline{X}^2}{2(1 - \rho_1 - \rho_2 - \ldots - \rho_{k-1})(1 - \rho_1 - \rho_2 - \ldots - \rho_k)} \quad (3)$$

where $N_Q^k$ is the number of messages in the message queue of priority class k, $\lambda_k$ is the arrival rate of messages of priority class k, $\overline{X}^2$ is the average second moment of service time for processing requests of class k, and $\rho_k$ is the system utilization for priority class k. The underlying assumption here is that assignment process is non-preemptive. Let C denote the total number of available channels to the LAA 48 as provided by the optimizer, and let M be the size of the message queue as defined by equation 4:

$$M = \sum_{i=1}^{k} N_i^Q \quad (4)$$

Then, as long as C≧M, there will no dropping of the messages. The assumption here is that each message requires a dedicated or random channel. In the event C<M, it will be likely that some messages (with low priority or QoS levels that are hard to be met) may not be assigned a channel at all or face excessive delays, and as a result may be dropped. However, the DPA architecture allows tuning of the parameters such that the probability of dropping of a message from the message queue can be minimized. This tuning is achieved through the fast and slow feedback loops that are always cognitive of changes in the environment and adjust the synthesis and optimization of channels.

The LAA 48 assumes that the channel lists (dedicated and random access) provided by the optimizer 40 meet certain SIR and QoS levels. The DPA architecture is flexible enough to allow dynamic partitioning of total channels in different pools, where each pool is targeted for a specific application, e.g., delay tolerant or delay intolerant application.

Figure 11:
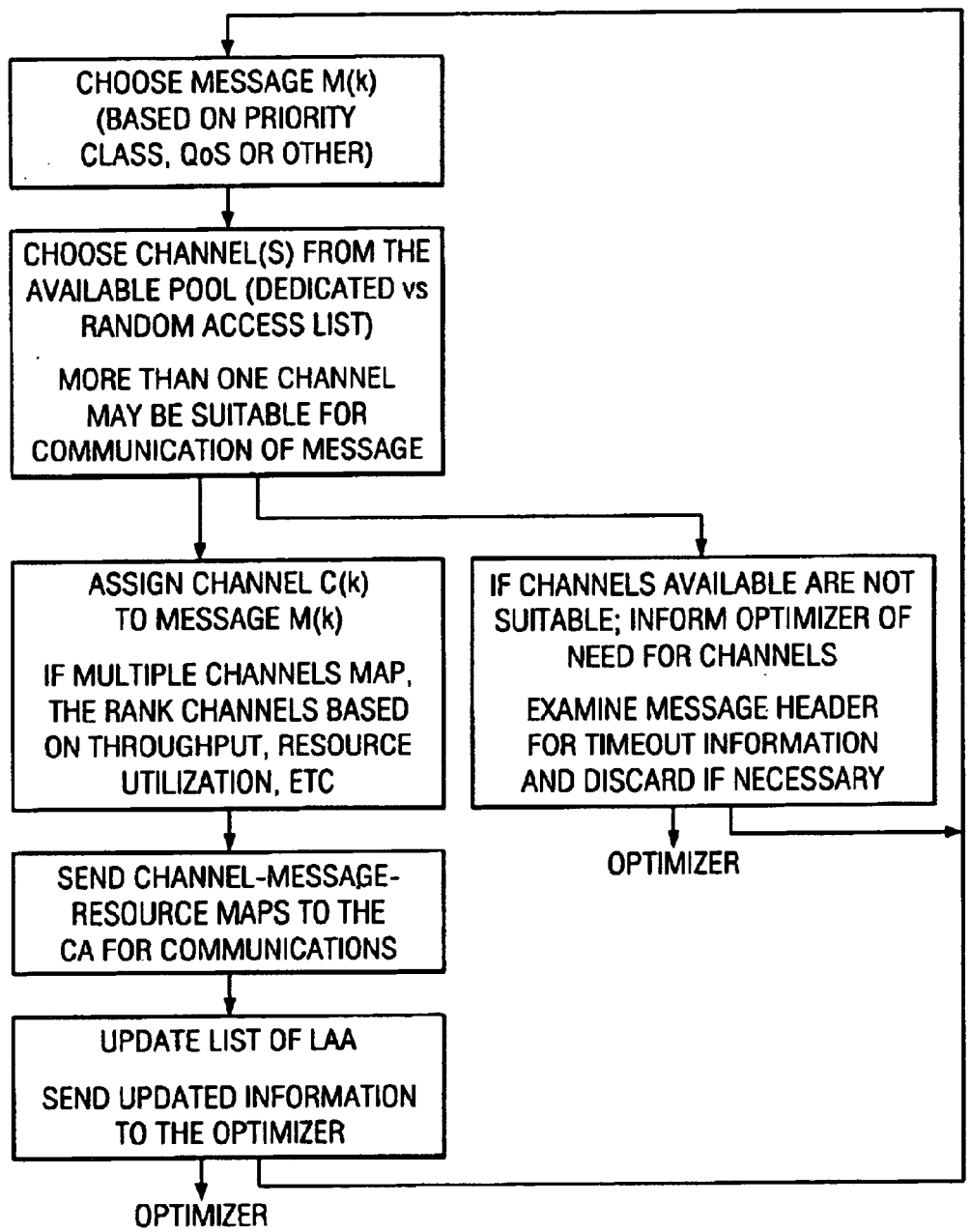
FIG. 11 is a flow chart illustrating an algorithm describing the operation of the look-ahead assignor of FIG. 4.

Referring to FIG. 11, there is illustrated an algorithm for LAA architecture. The algorithm performs the following steps:

Look at message queue to pick the right message.
Matching of channels assigned to messages. Request more channels from Optimizer if needed.
Suitability of a channel C(k) to message M(k).
If a good match is found, then the channel and message are tagged. If the match is not very good, then along with the tagging, a ranking is provided.
The channel-message mappings are sent to the CA.
The LAA list structure is updated with the mapping sets that went to the CA.

The Current Channel Assigner (CA) 50 provides the final mapping of messages to radio resources such that the overall system objectives are best met or approximated. The CA 50 computes the optimum parameters given the current message buffer and all possible holes that can be the next used. The goal of the channel assigner within the DPA architecture is that it should maximize the number of satisfied users within the available radio bandwidth.

This CA 50 works efficiently with traffic QoS requirements and uses those to prioritize transmission. Given less capacity than demand, the CA may be unable to fairly assign resources to all transmission needs. In the extreme, some messages may be left in the message buffer and will time out. This condition is detected by a large difference between current dedicated capacity and both average and peak demand. As spectrum becomes available, the Level 1 control will adjust by increasing the dedicated hole assignment. The combination of fast loop control (e.g., 10 ms) and slow loop control (e.g., 1 sec) provides a balance between optimizing QoS and satisfying the process to provide fair access to all nodes and messages.

The basic algorithm for the CA 50 examines the tagged pairs of messages received from the LAA 48 and matches to the pair the required wireless resources (waveform, modulation, coding, etc.) to complete a successful communications. It then requests the radio to transmit the data on the assigned channel. If the communication does not take place, due to several possible reasons, e.g., RF characteristics of channel got changed, a predicted channel did not became available, quality of channel got deteriorated, etc. then CA 50 determines if there are other alternate channels that can meet the message QoS requirements without timing out. If it can, then reassignment of a channel takes place and the lists in the CA and LAA are updated. Failing that possibility, the message is dropped from the queue. The synthesizer 38, optimizer 40 and LAA 48 are alerted of this event(s), so that alterations can be made in the channel makeup and assignment for future communication attempts.

Referring again to FIG. 1, the network for dynamic wireless resource utilization includes open interfaces enabling sharing of resources. In addition, the network has billing and authentication capabilities and a shared database.

For modeling use of wireless resources, a predetermined knowledge of existing resource usage on a location and time basis is required. Information is also required on frequency, spatial, and temporal dependencies to model the trading and allocation of wireless resources using existing systems.

The wireless terminals 10 may be adaptive radios capable of handling large bandwidths and multiple protocols. The network has the ability to assign resources on a demand basis utilizing radios capable of handling different protocols and providing a clearinghouse for shared databases.

Although a preferred embodiment of the invention has been illustrated in the accompanying drawings and described in the foregoing description, it will be understood that the invention is not limited to the embodiments disclosed, but is capable of numerous rearrangements and modifications of parts and elements without departing from the spirit of the invention.

What is claimed is:

1. A system for dynamic wireless resource utilization, the system comprising:

a sensing module operable to monitor one or more wireless communication resources and generate wireless communication resource data;

a prediction module operable, using the wireless communication resource data, to predict the occurrence of one or more holes in one or more future time periods, a hole comprising a wireless communication opportunity not associated with any existing channels in which one or more wireless communication resources assigned to one or more first users is temporarily available for wireless communication by one or more second users, the prediction module being further operable to generate hole prediction data;

a synthesizing module operable, using the hole prediction data, to create one or more wireless communication channels from the one or more predicted holes and generate channel synthesis data;

a selection module operable to receive data reflecting feedback from one or more previous wireless communication attempts and data reflecting one or more network conditions and, according to the received data and the channel synthesis data, select one or more particular wireless communication channels from the one or more created wireless communication channels, the selection module further operable to generate wireless communication channel selection data;

an assignment module operable, using the wireless communication channel selection data, to instruct a radio unit to communicate using the selected one or more particular wireless communication channels; and a deactivation module operable to instruct the radio unit to discontinue use of the selected one or more particular wireless communication channels after the communication has been completed.

2. The system of claim 1, wherein the selection module is operable, according to one or more wireless communication channel characteristics, to designate one or more backup wireless communication channels from the selected one or more particular wireless communication channels.

3. The system of claim 1, wherein the assignment module is operable to instruct the radio unit to communicate using one or more newly selected wireless communication channels in response to one or more changes in one or more network conditions.

4. The system of claim 1, wherein the one or more wireless communication resources are monitored with respect to one or more of power level, frequency, and time.

5. The system of claim 1, wherein the assignment module is operable to instruct the radio unit to communicate using the selected one or more particular wireless communication channels during a designated period of time.

6. The system of claim 1, wherein the assignment module is operable to instruct the radio unit to communicate a particular unit of data using the selected one or more particular wireless communication channels.

7. The system of claim 1, wherein the occurrence of one or more holes in one or more future time periods is predicted using one or more of:

an inertia-based technique;

a periodic technique;

a filter-based technique;

a time series prediction technique; and a spectral technique.

8. The system of claim 1, wherein a wireless communication channel is created from one or more holes using a pattern-matching technique.

9. The system of claim 1, wherein the one or more network conditions comprise quality of service (QoS) and use of one or more wireless communication resources by one or more network nodes.

10. The system of claim 1, wherein the one or more wireless resources comprise one or more of one or more frequency bands, time slots, codes, and power levels.

11. The system of claim 1, wherein a hole comprises one or more of one or more frequency bands, time slots, codes, or power levels.

12. The system of claim 1, wherein a created wireless communication channel comprises one or more holes meeting one or more criteria.

13. A method for dynamic wireless resource utilization, the method comprising:
monitoring one or more wireless communication resources;
generating wireless communication resource data;
using the wireless communication resource data, predicting the occurrence of one or more holes in one or more future time periods, a hole comprising a wireless communication opportunity not associated with any existing channels in which one or more wireless communication resources assigned to one or more first users is temporarily available for wireless communication by one or more second users;
generating hole prediction data;
using the hole prediction data, creating one or more wireless communication channels from the one or more predicted holes;
generating channel synthesis data;
receiving data reflecting feedback from one or more previous wireless communication attempts and data reflecting one or more network conditions;
according to the received data and the channel synthesis data, selecting one or more particular wireless communication channels from the one or more created wireless communication channels;
generating wireless communication channel selection data;
using the wireless communication channel selection data, instructing a radio unit to communicate using the selected one or more particular wireless communication channels; and
instructing the radio unit to discontinue use of the selected one or more particular wireless communication channels after the communication has been completed.

14. The method of claim 13, further comprising, according to one or more wireless communication channel characteristics, designating one or more backup wireless communication channels from the selected one or more particular wireless communication channels.

15. The method of claim 13, comprising instructing the radio unit to communicate using one or more newly selected wireless communication channels in response to one or more changes in one or more network conditions.

16. The method of claim 13, wherein the one or more wireless communication resources are monitored with respect to one or more of power level, frequency, and time.

17. The method of claim 13, comprising instructing the radio unit to communicate using the selected one or more particular wireless communication channels during a designated period of time.

18. The method of claim 13, comprising instructing the radio unit to communicate a particular unit of data using the selected one or more particular wireless communication channels.

19. The method of claim 13, wherein the occurrence of one or more holes in one or more future time periods is predicted using one or more of:
an inertia-based technique;
a periodic technique;
a filter-based technique;
a time series prediction technique; and
a spectral technique.

20. The method of claim 13, wherein a wireless communication channel is created from one or more holes using a pattern-matching technique.

21. The method of claim 13, wherein the one or more network conditions comprise quality of service (QoS) and use of one or more wireless communication resources by one or more network nodes.

22. The method of claim 13, wherein the one or more wireless resources comprise one or more of one or more frequency bands, time slots, codes, and power levels.

23. The method of claim 13, wherein a hole comprises one or more of one or more frequency bands, time slots, codes, or power levels.

24. The method of claim 13, wherein a created wireless communication channel comprises one or more holes meeting one or more criteria.

25. Software for dynamic wireless resource utilization, the software embodied in media and when executed operable to:
monitor one or more wireless communication resources;
generate wireless communication resource data;
using the wireless communication resource data, predict the occurrence of one or more holes in one or more future time periods, a hole comprising a wireless communication opportunity not associated with any existing channels in which one or more wireless communication resources assigned to one or more first users is temporarily available for wireless communication by one or more second users;
generate hole prediction data;
using the hole prediction data, create one or more wireless communication channels from the one or more predicted holes;
generate channel synthesis data;
receive data reflecting feedback from one or more previous wireless communication attempts and data reflecting one or more network conditions;
according to the received data and the channel synthesis data, select one or more particular wireless communication channels from the one or more created wireless communication channels;
generate wireless communication channel selection data;
using the wireless communication channel selection data, instruct a radio unit to communicate using the selected one or more particular wireless communication channels; and
instruct the radio unit to discontinue use of the selected one or more particular wireless communication channels after the communication has been completed.

26. The software of claim 25, further operable, according to one or more wireless communication channel characteristics, to designate one or more backup wireless communication channels from the selected one or more particular wireless communication channels.

27. The software of claim 25, operable to instruct the radio unit to communicate using one or more newly selected wireless communication channels in response to one or more changes in one or more network conditions.

28. The software of claim 25, wherein the one or more wireless communication resources are monitored with respect to one or more of power level, frequency, and time.

29. The software of claim 25, operable to instruct the radio unit to communicate using the selected one or more particular wireless communication channels during a designated period of time.

30. The software of claim 25, operable to instruct the radio unit to communicate a particular unit of data using the selected one or more particular wireless communication channels.

31. The software of claim 25, wherein the occurrence of one or more holes in one or more future time periods is predicted using one or more of:
- an inertia-based technique;
- a periodic technique;
- a filter-based technique;
- a time series prediction technique; and
- a spectral technique.

32. The software of claim 25, wherein a wireless communication channel is created from one or more holes using a pattern-matching technique.

33. The software of claim 25, wherein the one or more network conditions comprise quality of service (QoS) and use of one or more wireless communication resources by one or more network nodes.

34. The software of claim 25, wherein the one or more wireless resources comprise one or more of one or more frequency bands, time slots, codes, and power levels.

35. The software of claim 25, wherein a hole comprises one or more of one or more frequency bands, time slots, codes, or power levels.

36. The software of claim 25, wherein a created wireless communication channel comprises one or more holes meeting one or more criteria.

37. A system for dynamic wireless resource utilization, the system comprising:

means for monitoring one or more wireless communication resources;

means for generating wireless communication resource data;

means for, using the wireless communication resource data, predicting the occurrence of one or more holes in one or more future time periods, a hole comprising a wireless communication opportunity not associated with any existing channels in which one or more wireless communication resources assigned to one or more first users is temporarily available for wireless communication by one or more second users;

means for generating hole prediction data;

means for, using the hole prediction data, creating one or more wireless communication channels from the one or more predicted holes;

means for generating channel synthesis data;

means for receiving data reflecting feedback from one or more previous wireless communication attempts and data reflecting one or more network conditions;

means for, according to the received data and the channel synthesis data, selecting one or more particular wireless communication channels from the one or more created wireless communication channels;

means for generating wireless communication channel selection data;

means for, using the wireless communication channel selection data, instructing a radio unit to communicate using the selected one or more particular wireless communication channels; and means for instructing the radio unit to discontinue use of the selected one or more particular wireless communication channels after the communication has been completed.

* * * * *